United States Patent [19]

Uemura et al.

[11] 4,038,449

[45] July 26, 1977

[54] POLYPROPYLENE OR POLYMETHYLPENTENE FILM COATED WITH GRAFT UNDERCOAT MIXTURE AND VINYLIDENE CHLORIDE COPOLYMER TOP COATING

[75] Inventors: Koichi Uemura, Toyonaka; Tetsuo Ishihara; Shigeyuki Takahashi, both of Amagasaki, all of Japan

[73] Assignee: Daicel, Ltd., Osaka, Japan

[21] Appl. No.: 643,371

[22] Filed: Dec. 22, 1975

[30] Foreign Application Priority Data

Dec. 27, 1974 Japan .................................... 50-3633
Feb. 6, 1975 Japan .................................. 50-15698

[51] Int. Cl.$^2$ ............................................ B32B 31/00
[52] U.S. Cl. ................................... 428/220; 428/517; 428/518; 428/519; 428/910; 427/407 C
[58] Field of Search ............... 428/517, 518, 519, 332, 428/910, 336, 220; 427/407 C

[56] References Cited

U.S. PATENT DOCUMENTS

| | | | |
|---|---|---|---|
| 3,041,208 | 6/1962 | Hay et al. ............................. | 428/518 |
| 3,218,189 | 11/1965 | Tyler ................... | 428/518 X |
| 3,242,038 | 3/1966 | Dallas et al. ...................... | 428/517 X |
| 3,262,808 | 7/1966 | Crooks et al. .................... | 428/518 X |
| 3,353,991 | 11/1967 | Shelburg et al. ..................... | 428/518 |
| 3,423,232 | 1/1969 | Reinhard et al. ................ | 428/519 X |

Primary Examiner—P. C. Ives
Attorney, Agent, or Firm—Blanchard, Flynn, Thiel, Boutell & Tanis

[57] ABSTRACT

A polyolefin film is coated with an undercoat of a mixture of (a) graft copolymer of chlorinated polypropylene to which is grafted a chlorinated vinyl monomer or a styrene monomer and (b) acrylonitrile-butadiene rubber, and a top coat of vinylidine chloride copolymer.

5 Claims, No Drawings

POLYPROPYLENE OR POLYMETHYLPENTENE FILM COATED WITH GRAFT UNDERCOAT MIXTURE AND VINYLIDENE CHLORIDE COPOLYMER TOP COATING

BACKGROUND OF THE INVENTION

1. Field of the Invention

This invention relates to processes for the preparation of coated polyolefin films and more particularly to a process for preparing coated polyolefin films possessing excellent properties of heat-sealability, water vapor and oxygen gas impermeability, adhesive cellophane tape peeling strength of the coating and transparency.

2. Description of the Prior Art

One of the packaging films most widely used today is a laminated film made by laminating polyethylene on cellophane. This combines the heat-sealability and water vapor barrier property of the polyethylene with the oxygen gas barrier property of the cellophane. However, when polyethylene is laminated on cellophane, not only does the price become higher, but also the excellent transparency of the cellophane is lost, the oxygen gas barrier property may still be insufficient and the range of use of the film product is limited. On the other hand, the heat-sealability depends on the thickness of the laminated polyethylene, but it far exceeds the usual practical strength requirements.

On the other hand, a biaxially stretched film of an isotactic polypropylene is noted for its excellent strength and transparency, but it is low in the oxygen gas barrier property and, because it is biaxially stretched and possesses a high crystallizability, thermal shrinkage thereof occurs at high temperatures and its heat-sealability is quite insufficient. Therefore, the uses of a biaxially stretched polypropylene film alone as a packaging film are considerably limited as compared with those of films of polyethylene laminated to cellophane.

The present inventors have suggested a process (which shall be referred to as a two-step coating process hereinafter) wherein a polypropylene film is coated with an undercoating consisting mostly of a chlorinated polypropylene resin (which shall be referred to as a graft polymer hereinafter) on which vinyl chloride or vinylidene chloride is graft-polymerized (the content of vinyl chloride or vinylidene chloride being 2 to 30% by weight based on the graft polymer) and with a top coating consisting mostly of a vinylidene chloride resin emulsion, and a process (which shall be referred to as a one-step coating process hereinafter) wherein the polypropylene film is coated with a composition consisting mostly of said graft polymer and vinylidene chloride resin (Japanese patent publication No. 9099/1974), to improve the heat-sealability and oxygen gas barrier property.

Furthermore, the present inventors have suggested (1) a one-step coating process (Japanese patent publication No. 8400/1972) wherein a composition consisting mostly of a mixture of a chlorinated polypropylene resin (which shall be referred to as a graft polymer hereinafter) on which a styrenic monomer is graft-polymerized and a vinylidene chloride resin, and (2) a two-step coating process (Japanese patent publication No. 36874/1972) wherein an under-coating consisting mostly of said graft polymer and a top-coating consisting mostly of a vinylidene chloride resin, are respectively applied to polypropylene films to improve the heat-sealability and oxygen gas barrier property.

However, in the above mentioned two-step coating process, when the surface coated with the under-coating consisting mostly of the graft polymer is coated with the vinylidene chloride resin emulsion as a top-coating, the adhesive cellophane tape peeling strength of the coating layer will be favorable, but the heat-sealing strength will be so insufficient that the uses of the thus-coated biaxially stretched polypropylene film alone will be considerably limited.

SUMMARY OF THE INVENTION

We have discovered a process for preparing coated polyolefin films in which the above-mentioned poor properties of the prior art products are improved, the excellent properties of the prior art products are retained and the heat-sealability required in practical use is obtained, without laminating polyethylene onto the polyolefin film. The present invention provides a process for preparing highly heat-sealable coated polyolefin films characterized by coating a polyolefin film substrate with (A) an under-coating consisting mostly of either (1) a mixture of a graft polymer and an acrylonitrile-butadiene rubber, or (2) a composition obtained by further mixing a chlorinated polypropylene resin with the mixture (1), and then with (B) a liquid top-coating consisting mostly of a vinylidene chloride resin emulsion.

As the graft polymer, there is used a graft polymer obtained by graft-polymerizing (a) from 2 to 30% by weight, based on the weight of the graft polymer, of a vinyl monomer, on (b) a chlorinated polypropylene having a chlorine content of 15 to 55% by weight (obtained by chlorinating polypropylene having an intrinsic viscosity of 0.3 to 3 dl/g.). As the vinyl monomers, there can be enumerated vinyl chloride and vinylidene chloride. The vinyl monomers also include a mixture of vinyl chloride or vinylidene chloride monomer and a small amount of less than 50% by weight, based on the total vinyl monomers, of one or more other polymerizable vinyl monomers. As such other vinyl monomers, there can be enumerated styrene monomers (as defined below), vinyl acetate, vinyl propionate, 1,3-butadiene, acrylonitrile, methacrylonitrile, acrolein, various alkyl acrylates and various alkyl methacrylates, wherein the alkyl group has one to 12 carbon atoms.

Furthermore, a graft polymer obtained by graft-polymerizing (a) from 2 to 30% by weight, based on the weight of the graft polymer, of a styrene monomer, on (b) a chlorinated polypropylene having a chlorine content of 15 to 55% by weight (obtained by chlorinating a polypropylene of an intrinsic viscosity of 0.3 to 3 dl./g.) can also be used in the present invention. As the styrene monomers, there can be used styrene, various nucleus-substituted styrenes and various α-hydrogen-substituted styrenes, and mixtures thereof. As examples of styrene monomers, there can be enumerated styrene, α-methylstyrene, p-methylstyrene, m-methylstyrene, 2,4-dimethylstyrene, 2,5-dimethylstyrene, o-chlorostyrene, m-chlorostyrene, p-chlorostyrene, 2,4-dichlorostyrene, p-chlorostyrene, 2,4-dichlorostyrene, 2,5-dichlorostyrene, o-bromostyrene and p-iodostyrene. Particularly preferred styrene monomers are styrene and α-methylstyrene. Further, there can also be used, as the styrene monomer, a mixture of a major amount (more than 50 wt. %) of one or a mixture of styrene monomers as described above, and a minor amount (less than 50 wt. %) of one or a mixture of other copolymerizable vinyl monomers. As such other copolymerizable vinyl monomers, there can be enumerated vinyl chloride, vinylidene chloride, vinyl acetate, vinyl propionate, 1,3-butadiene, acrylonitrile, methacrylonitrile, acrolein, various alkyl acrylates and various alkyl methacrylates, wherein the alkyl group has one to 12 carbon atoms.

As the chlorinated polypropylenes, there can be used those obtained by chlorinating crystalline or noncrystalline polypropylenes. It is preferred that the intrinsic viscosity of the starting polypropylene material is at least 0.3 dl./g. If the intrinsic viscosity thereof is below 0.3 dl./g., the film-forming ability will be low and the heat seal strength of the coated polyolefin film will be lower. When the intrinsic viscosity thereof is above 3.0 dl./g., the viscosity of the solution will become so high that the workability will become insufficient and the heat seal strength of the coated polyolefin film will tend to become lower. The preferred range of the intrinsic viscosity is 0.5 to 1.5 dl./g. Such intrinsic viscosity is determined by measuring the viscosity of a dilute solution of the polymer (0.2 to 0.5 wt. %) in decalin at 135° C.

The chlorine content in the chlorinated polypropylene is preferably 15 to 55% by weight. When it is below 15%, the organic solvent solubility and the compatibility with the vinylidene chloride resin will become insufficient. When it is above 55%, the heat stability will be low and the heat seal strength of the coated polyolefin film will be lower. The chlorinated polypropylene can be prepared by chlorinating polypropylene in the state of a solution, suspension or solid dispersion in a conventional manner. Such a process is described, for example, in J. Polymer Sci., 55, 169 (1961) and "High Polymers (Kobunshi)", 9, 903 (1960).

The graft polymerization of various monomers onto chlorinated polypropylenes can be carried out by a known process as is described, for example, in Ind. Chem., 64, 172 (1961).

Any of the known emulsion, suspension and solution systems can be employed but, in view of the uniformity of the graft, the solution system is the best. As solvents for the graft polymerization, there can be used various kinds of solvents capable of dissolving chlorinated polypropylenes but particularly preferred solvents are aromatic hydrocarbons such as benzene and toluene and chlorinated hydrocarbons such as carbon tetrachloride and chloroform. As catalysts for the graft polymerization, there can be used various known kinds of catalysts.

There can be used such known conventional radical polymerization catalysts including various peroxides, azo compounds and persulfates, and redox catalyst systems obtained by the combination of these catalysts with various reducing agents such as, for example, ascorbic acid, dimethylaniline, formaldehyde and sodium sulfoxylate. Various metal chelate compounds described in recent years such as, for example, chelate compounds of transition metals in groups I and VI to VIII in the Periodic Table with 1,3-dicarbonyl compounds can also be used. It is also recently reported (for example, in Polymer Letters, 5, 697 (1967) that mixtures of various activated metals with organic halogen compounds have polymerization initiating activities. As a result of noting that a chlorinated polypropylene has a carbon-chlorine bond and investigating the combination of it with an activated metal, we have confirmed that a graft polymerization can be effected by using such a combination. Therefore, various activated metals such as reduced copper, iron, nickel and cobalt can be used as graft polymerization initiators.

When vinyl chloride monomer or vinylidene chloride monomer is employed for the graft-polymerization, the amount of the polymerization catalyst, other than activated metals, that can be used is from 0.1 to 5 mol % (based on the monomer), but it is particularly preferred to use from 0.2 to 2 mol % of the polymerization catalyst. However, when an activated metal is used, a range of 0.5 to 15% by weight (based on the monomer) is used, preferably from 1 to 8% by weight.

When vinyl chloride or vinylidene chloride is employed as the monomer, the temperature and time for the graft polymerization can be selected within wide ranges. However, the particularly preferred temperature range is 20° to 100° C and the polymerization time is 1 to 24 hours. Various known chain transfer agents can be used in the graft polymerization reaction mixture.

In the graft polymerization in which styrene monomer is employed, the amount of the polymerization catalyst (other than the activated metals) used is from 0.1 to 2.5 mol % (based on the monomer), but it is preferred to be 0.2 to 1.5 mol %. However, in the case of using an activated metal as catalyst, the range of 0.5 to 15% by weight (based on the monomer) is used, but it particularly preferred to use 1 to 8% by weight. When styrene monomer is used, the temperature and time for the graft polymerization can also be selected within wide ranges. However, the particularly preferred temperature range is 20° to 100° C and the polymerization time is 1 to 24 hours. Also, various chain transfer agents can be used in the graft polymerization reaction mixture.

Further, the content of the vinyl chloride monomer, the vinylidene chloride monomer or the styrene monomer in the graft polymer is preferably in the range of 2 to 30% by weight. When it is below 2%, the effect will be insufficient and, when it is above 30%, the heat seal strength will be reduced.

The emulsion (latex) of the vinylidene chloride resin used as the top-coating in the present invention can be of any known type such as a vinylidene chloride-acrylonitrile copolymer, vinylidene chloride-vinyl chloride copolyer, vinylidene chloride-vinyl acetate copolymer, vinylidene chloride-acrylate copolymer, vinylidene chloride-acrylic acid copolymer or such copolymers further copolymerized with acrylic acid or methacrylic acid as a third component. It is particularly preferred to use an emulsion of a vinylidene chloride-acrylonitrile copolymer or vinylidene chloride-vinyl chloride copolymer. An emulsion of a vinylidene chloride homopolymer is improper in respect of the heat stability, weather-proofness and softness of the film. The vinylidene chloride resin thus is a copolymer containing from 80 to 95 weight % of vinylidene chloride monomer units and the balance is one or more vinyl-type monomer units.

The acrylonitrile-butadiene rubber used in the present invention can be any of commercially available high acrylonitrile copolymers, medium high acrylonitrile copolymers and low acrylonitrile copolymers. The rubber contains from 19 to 41 weight % of acrylonitrile monomer units and the balance is butadiene monomer units.

The polyolefin film used in the present invention is a crystalline polypropylene film or a crystalline poly-4-methylpentene-1 film. A biaxially stretched crystalline polypropylene film is a particularly preferred material in respect of its high melting point, high transparency, high mechanical properties and high packaging adaptability.

The under-coating composition consists essentially of a mixture of the graft copolymer and the acrylonitrile-butadiene rubber, wherein the weight ratio of the graft copolymer/acrylonitrile-butadiene rubber is from 95/5 to 5/95, preferably 25/75 to 75/25, parts by weight. The under-coating composition can also contain mixed therein, up to 70 percent by weight, based on the total weight of the under-coating composition, of said chlorinated polypropylene (not the graft copolymer), as an optional ingredient.

In coating, there are known various methods of pre-treating the surface of a polyolefin film to improve its bondability. In the present invention, too, such known methods as pretreatments with corona discharge, high frequency electrical energy, flame and chromium mixed solutions can be used. However, it is an important feature of the present invention that an excellent result can be obtained, even if such pretreatment is not effected.

In the present invention, any known coating devices such as a dip coater, roll coater, lot coater, air knife coater or gravure coater can be used to apply the under-coating and the top-coating.

Conventional additives such as antioxidant, dye, pigment, lubricant, antistatic agent, antiblocking agent and ultraviolet ray stabilizer can be added to the coating of the present invention. The total thickness of the coating layer (undercoat plus top-coat) is from 1 to 10 microns, preferably from 2 to 5 microns. The ratio of the thickness of the topcoat to the thickness of the undercoat can be in the range of 1/20 to 20/1, preferably about 6/1 to 12/1. The thicker the coating layer, the higher is the heat sealability and the oxygen gas barrier property of the coated film. However, the use of an excess of the coating will be not only disadvantageous as to cost, but also will have an unfavorable thickness of the effect on the transparency of the film product.

The methods of testing the properties of the coated polyolefin films shall be described in the following:

Adhesive cellophane tape test

This is a method similar to a testing method usually called the "Scotch" tape test. A pressure-sensitive adhesive cellophane tape of a size of 24 mm × 200 mm was pressed onto the resin-coated surface from end to end as to be strongly adhered thereto and was then quickly peeled off at an angle of 90 degrees. The stripped state of the film was observed and was evaluated as follows:

| | |
|---|---|
| When the resin was not stripped at all, | Excellent. |
| When the stripped area of the resin was less than 10%, | Good. |
| When the stripped area of the resin was 10 to 20%, | Passable. |
| When the stripped area of the resin was more than 20%, | Bad. |

Heat seal strength

The coated surfaces of films were placed on each other and were heat-sealed with a bar type heat sealer under the conditions of a heater temperature of 120° C, a pressing pressure of 2 kg./cm² and a pressing time of 2 seconds. The stripping strength of the heat seal thereby obtained was measured from a sample of 10 mm × 150 mm under the condition of a pulling velocity of 300 mm/min. by using a Tensilon tester.

Water vapor permeability

This was measured under the conditions of a temperature of 40° C and a relative humidity of 90%, by using a cup specified in JIS Z-0208.

Oxygen gas permeability

This was measured at 20° C by using oxygen gas under a humidity of 0% and helium gas as a compensating gas by a gas chromatograph method (with Lysey gas permeability testing apparatus L-66).

Transparency

| | |
|---|---|
| This was evaluated as follows by naked eye judgment: | |
| When it was equal to that of a biaxially stretched polypropylene film, | Excellent. |
| When it was very little lower than that of a biaxially stretched polypropylene film, | Good. |
| When it was considerably lower than that of a biaxially stretched polypropylene film but was a little higher than that of a low density polyethylene film, | Passable. |
| When it was equal to or lower than that of a low density polyethylene film, | Bad. |

The invention is further described by reference to the following Examples which are given to explain, but not to limit the scope of, the present invention.

EXAMPLE 1

The graft polymer used in this example was prepared as follows:

An isotactic polypropylene of an intrinsic viscosity of 1.5 dl./g. was dissolved at 120° C in tetrachlorethylene and chlorine gas was blown into the solution in a conventional manner to obtain a chlorinated polypropylene having a chlorine content of 30% by weight and an intrinsic viscosity of 1.2 dl./g. Then 100 g. of this chlorinated polypropylene and 500 g. of toluene were placed in an autoclave of a capacity of 1 liter and were well agitated so as to form a solution. Then 50 g. of vinyl chloride and 3.5 g. of benzoyl peroxide were placed into the solution. The solution was warmed to 60° C and was reacted for 10 hours in an oxygen-free atmosphere. The polymer obtained by reprecipitating and purifying the reaction product was 115 g. The vinyl chloride content in the polymer was calculated from the nuclear magnetic resonance spectrum of this polymer, and it was 13.8 wt.%. Utilizing the facts that chlorinated polypropylene is soluble in carbon tetrachloride but that polyvinyl chloride is poorly soluble in carbon tetrachloride, this polymer was dissolved in carbon tetrachloride, and the insoluble part was filtered off. The vinyl chloride content in the reprecipitated and refined polymer was 12.4 wt.%. For this result it was determined that the greater part of the polymerized vinyl chloride was bonded in the form of a graft with the chlorinated polypropylene.

The graft polymer obtained by the above process and an acrylonitrile-butadiene rubber (29 wt.% acrylonitrile) were dissolved in toluene : tetrahydrofuran (at a weight ratio of 1 : 1) in the following weight proportions. Then the solution was applied by using a Meyer bar to coat the surface of a biaxially stretched polypropylene film (of a thickness of 20 microns) pretreated with corona discharge and having a contact angle of 60 degrees with water. The coated film was then dried for 10 minutes in an oven at 110° C. The dried coating amount was 0.5 to 0.6 g./m².

Then the below mentioned top-coating (Recipe A) consisting mostly of a vinylidene chloride-acrylic ester copolymer emulsion (85 wt.% vinylidene chloride) was applied by using a Meyer bar to coat said under-coated surface. The coated film was dried for 1 minute in an oven at 115° C. The total amount of the combination of the under-coating and the top-coating deposited on the film after drying was 5.5 to 6.0 g./m².

In the following table, Examples 1-1 and 1-9 are outside the scope of the present invention and are shown for reference purposes. The properties of the thus-obtained coated films are shown in Table 1.

Table 1

| Example No. | Under-coating Graft polymer/ acrylonitrile butadiene rubber (weight ratio) | Top-coating | Adhesive cellophane tape test | Heat seal strength (g/15 mm) |
|---|---|---|---|---|
| 1-1 (control) | 0/100 | | Bad | 153 |
| 1-2 | 5/95 | | Excellent | 176 |
| 1-3 | 10/90 | | " | 224 |
| 1-4 | 25/75 | Top-coating | " | 283 |
| 1-5 | 50/50 | | " | 364 |
| 1-6 | 75/25 | Recipe (A) | " | 356 |
| 1-7 | 90/10 | | " | 302 |
| 1-8 | 95/5 | | " | 214 |
| 1-9 (control) | 100/0 | | " | 185 |

| Top-coating (Recipe A): | Parts by weight as solid component |
|---|---|
| Vinylidene chloride-acrylic ester copolymer emulsion (85% vinylidene chloride) (solid content: 50 wt.%) | 100 |
| wax (of a melting point of 65° C) emulsion | 2.0 |
| Calcium carbonate | 0.1 |

Each of the coated films in Examples 1-2 to 1-8 had a water vapor permeability of 6 g./m²/24 hrs. and an oxygen gas permeability of 24 cc/m²/24 hrs. and was excellent in transparency.

EXAMPLE 2

The under-coating and top-coating used in Examples 1-5 were prepared by using the graft polymer used in the above mentioned Example 1 and were applied in varying amounts in the same manner as described in Example 1 to coat biaxially stretched polypropylene films of a thickness of 20 microns pretreated with a corona discharge.

The properties of the coated films are set forth in Tables 2-A and 2-B.

Table 2-A

| Example No. | Coating Amount of top-coating (g/m²) | Coating amount of under-coating + top-coating (g/m²) | Adhesive cellophane tape test | Heat seal strength (g/15 mm) | water vapor permeability (g/m²/24 hrs) | oxygen gas permeability (cc/m²/24 hrs) | Transparency |
|---|---|---|---|---|---|---|---|
| 2-1 | 0.5 | 3.4 | Excellent | 275 | 7 | 40 | Excellent |
| 2-2 | 0.6 | 6.5 | " | 383 | 6 | 21 | " |
| 2-3 | 0.5 | 8.3 | " | 399 | 5 | 20 | " |
| 2-4 | 0.5 | 10.1 | " | 415 | 5 | 17 | Good to excellent |

Table 2-B

| Example No. | Coating Amount of under-coating (g/m²) | Coating amount of under-coating + top-coating (g/m²) | Adhesive cellophane tape test | Heat seal strength (g/15 mm) | Water vapor permeability (g/m²/24 hrs) | Oxygen gas permeability (cc/m²/24 hrs) | Transparency |
|---|---|---|---|---|---|---|---|
| 2-5 | 0.4 | 5.4 | Excellent | 291 | 6 | 24 | Excellent |
| 2-6 | 0.7 | 5.7 | " | 368 | 6 | 24 | " |
| 2-7 | 0.9 | 6.3 | " | 375 | 6 | 23 | " |
| 2-8 | 1.3 | 6.8 | " | 392 | 5 | 23 | " |

EXAMPLE 3

Under-coatings of the below mentioned recipes were prepared by using the graft polymer used in the above mentioned Example 1 and acrylonitrile-butadiene rubbers of different acrylonitrile contents and were applied in the same manner as in Example 1 and were then the top-coating (Recipe A) was applied. The coating amount of the under-coating was 0.5 to 0.6 g./m² and the coating amount of the under-coating plus top-coating was 5.5 to 6.0 g./m². The properties of the coated films were as set forth in Table 3.

Table 3

| Example No. | Under-coating Graft polymer acrylonitrile butadiene rubber | Acrylonitrile content (%) in acrylonitrile-rubber | Top-coating | Adhesive cellophane tape test | Heat seal strength (g/15 mm) |
|---|---|---|---|---|---|
| 3-1 | 50/50 | 19 | | Excellent | 335 |
| 3-2 | 50/50 | 33 | | " | 363 |

Table 3-continued

| Example No. | Under-coating Graft polymer acrylonitrile butadiene rubber | Acrylonitrile content (%) in acrylonitrile-rubber | Top-coating | Adhesive cellophane tape test | Heat seal strength (g/15 mm) |
| --- | --- | --- | --- | --- | --- |
| 3-3 | 50/50 | 41 | Recipe (A) | " | 357 |
| 3-4 (control) | 0/100 | 19 | | Bad | 145 |
| 3-5 (control) | 0/100 | 33 | | " | 138 |
| 3-6 (control) | 0/100 | 41 | | " | 136 |

Examples 3-4 to 3-6 are to be compared to Examples 3-1 to 3-3 and are outside the scope of the present invention. Each of the coated films in Examples 3-1 to 3-3 had a water vapor permeability of 6 g./m²/24 hrs. and an oxygen gas permeability of 25 cm/m²/24 hrs. and was excellent in the transparency.

EXAMPLE 4

The graft polymer used in this example was prepared as follows. An isotactic polypropylene of an intrinsic viscosity of 1.5 dl./g. was chlorinated by the process as described in Example 1 to obtain a chlorinated polypropylene having a chlorine content of 28% by weight and an intrinsic viscosity of 1.3 dl./g. Then 100 g. of this chlorinated polypropylene and 0.6 liter of toluene were placed into an autoclave of a capacity of 1 liter and were well agitated to form a solution. Then 3.8 g. of reduced iron and 50 g. of vinyl chloride were placed in the solution. The solution was heated to 70° C and was reacted for 5 hours in an oxygen-free atmosphere. The amount of the obtained polymer was 119 g. and it had a vinyl chloride content of 16.8 wt.%.

This graft polymer, an acrylonitrile-butadiene rubber (having an acrylonitrile content of 29%) and a chlorinated polypropylene (having a chlorine content of 30% by weight) were dissolved in toluene : tetrahydrofuran (of a weight ratio 1 : 1) and were then mixed to prepare the under-coating mentioned below and the top-coating Recipe (A) was used for the top-coating to prepare a coated film in the same manner as described in Example 1. The coating amount of the under-coating was 0.5 to 0.6 g./m² and the total coating amount of the combination of the under-coating and top-coating was 5.5 to 6.0 g./m².

The properties of the coated films were as shown in Table 4.

Table 4

| Example No. | Under-coating Graft polymer/chlorinated polypropylene/acrylonitrile-butadiene rubber | Top-coating | Adhesive cellophane tape test | Heat seal strength (g/15 mm) | Oxygen gas Barrier property (cc/m²/24 hrs |
| --- | --- | --- | --- | --- | --- |
| 4-1 | 40/10/50 | | Excellent | 367 | 23 |
| 4-2 | 20/30/50 | Top-coating Recipe (A) | " | 336 | 23 |
| 4-3 | 10/20/70 | | " | 331 | 25 |
| 4-4 (control) | 0/50/50 | | " | 165 | 24 |

Each of the coated films in Examples 4-1 to 4-3 had a water-vapor permeability of 6 cc/m²/24 hrs. and was excellent in the transparency.

EXAMPLE 5

The under-coating used in Example 1-5 was applied and dried in the same manner as described in Example 1 and then a top-coating (Recipe B) was applied to coat said coated film surface and was then dried to prepare a coated film. In this case, films treated and not treated with corona discharge (the latter having a contact angle of 83 degrees with water) were also coated.

| Top-coating (Recipe B) | |
| --- | --- |
| Vinylidene chloride-vinyl chloride-acrylic ester copolymer emulsion (85/8/5) (solid content: 50 wt.%) | Parts by weight as solid component 100 |
| Wax emulsion (of a melting point of 65° C) | 2.0 |
| Calcium carbonate | 0.1 |

The properties of the coated films are shown in Table 5.

Table 5

| Example No. | Corona discharge treatment of film | Coating amount of under-coating (g/m²) | Coating amount of under-coating + top-coating (g/m²) | Adhesive cellophane tape test | Heat seal strength (g/15 mm) | Water vapor permeability (g/m²/24 hrs) | Oxygen gas permeability (cc/m²/24 hrs) | Transparency |
| --- | --- | --- | --- | --- | --- | --- | --- | --- |
| 5-1 | Done | 0.5 | 4.3 | Excellent | 328 | 6 | 32 | Excellent |
| 5-2 | " | 0.5 | 8.7 | " | 413 | 5 | 16 | " |
| 5-3 | Not done | 0.6 | 4.8 | Excellent | 321 | 6 | 33 | Excellent |
| 5-4 | " | 0.5 | 8.3 | " | 394 | 5 | 16 | " |

EXAMPLE 6

A graft polymerization reaction was carried out in exactly the same manner as described in Example 4 except that 50 g. of vinylidene chloride were used instead of 50 g. of vinyl chloride and the reaction time was 10 hours. The amount of the obtained graft polymer was 114 g. and it had a vinylidene chloride content of 12.6%.

The under-coating in Example 1-5 was prepared by using this graft polymer and a coated biaxially stretched polypropylene film was prepared in the same manner as in Example 1-5.

The properties of the coated films are shown in Table 6.

polymers. The vinyl chloride contents were respectively 12.2, 12.5 and 11.8%.

By using the graft polymers obtained in the above process, and employing an acrylonitrile-butadiene rubber (of an acrylonitrile content of 33%) dissolved in tetrahydrofuran, under-coatings of the below mentioned recipes were prepared and coated films were made in the same manner as described in Example 1. The coating amount of the under-coating was 0.5 to 0.6

Table 6

| Example No. | Coating Amount of under-coating (g/m$^2$) | Coating amount of under-coating + top-coating (g/m$^2$) | Adhesive cellophane tape test | Heat seal strength (g/15 mm) | Water vapor permeability (g/m$^2$/24 hrs) | Oxygen gas permeability (cc/m$^2$/24 hrs) | Transparency |
|---|---|---|---|---|---|---|---|
| 6-1 | 0.5 | 4.1 | Excellent | 313 | 6 | 32 | Excellent |
| 6-2 | 0.5 | 8.2 | " | 425 | 5 | 17 | " |

EXAMPLE 7

A noncrystalline polypropylene of an intrinsic viscosity of 0.64 dl./g. was dissolved in toluene at 80° C and chlorine gas was blown into the solution to obtain a chlorinated polypropylene having a chlorine content of 32% by weight. A graft polymer was obtained in exactly the same manner as in Example 1 by using this polymer. The vinyl chloride content of this polymer was 14.8%.

The under-coating described in Example 1-5 was prepared by using this graft polymer and a coated film was made in the same manner as in Example 1-5.

g./m$^2$. The total coating amount was 5.5 to 6.0 g./m$^2$.

The properties of the obtained coated films are shown in Table 8.

Table 8

| Example No. | Under-coating Graft polymer acrylonitrile-butadiene rubber | Under-coating Chlorine content in chlorinated polypropylene | Under-coating Vinyl chloride content in graft polymer (% by weight) | Top-coating | Adhesive cellophane tape test | Heat seal strength (g/15 mm) | Oxygen gas Barrier property (cc/m$^2$/24 hrs) |
|---|---|---|---|---|---|---|---|
| 8-1 | 50/50 | 18 | 12.2 | | Excellent | 342 | 21 |
| 8-2 | 50/50 | 25 | 12.5 | | " | 339 | 23 |
| 8-3 | 50/50 | 40 | 11.8 | | " | 313 | 22 |
| 8-4 (control) | 50/50 | 18 | 0 | Top-coating Recipe (A) | " | 153 | 23 |
| 8-5 (control) | 50/50 | 25 | 0 | | " | 161 | 23 |
| 8-6 (control) | 50/50 | 40 | 0 | | " | 145 | 24 |

Examples 8-4 to 8-6 are controls and are outside the scope of the present invention. Each of the coated films in Examples 8-1 to 8-3 had a water vapor permeability of 6 g./m$^2$/24 hrs. and was excellent in transparency.

The following examples illustrate the use of a styrene monomer.

EXAMPLE 9

The graft polymer used in this example was prepared as follows. An isotactic polypropylene of an intrinsic Table 7

| Example No. | Coating amount of under-coating (g/m$^2$) | Coating amount of under-coating + top-coating (g/m$^2$) | Adhesive cellophane tape test | Heat seal strength (g/15 mm) | Water vapor permeability (g/m$^2$/24 hrs) | Oxygen gas permeability (cc/m$^2$/24 hrs) | Transparency |
|---|---|---|---|---|---|---|---|
| 7-1 | 0.6 | 4.7 | Excellent | 308 | 6 | 33 | Excellent |
| 7-2 | 0.5 | 9.1 | " | 414 | 5 | 18 | " |

EXAMPLE 8

An isotactic polypropylene of an intrinsic viscosity of 1.0 dl./g. was dissolved in tetrachlorethylene at 120° C and the solution was chlorinated by blowing chlorine gas into it for various periods of time to obtain chlorinated polypropylenes having chlorine contents of 18, 25 and 40% by weight. Graft polymers were prepared in the same manner as described in Example 1 from these viscosity of 1.0 dl./g. was dissolved in tetrachlorethylene at 120° C and chlorine gas was blown into the solution in a conventional manner to obtain a chlorinated polypropylene having a chlorine content of 30% by weight and an intrinsic viscosity of 0.8 dl./g. Then 120 g. of this chlorinated polypropylene, 0.7 liter of benzene and 120 g. of styrene were placed in a polymerization reactor of a capacity of 1 liter and were well agitated to form a solution thereof. Then 2.8 g. of benzoyl peroxide were placed in the solution. The solution was warmed to 70° C and was reacted for 5 hours under a nitrogen atmosphere. The amount of polymer obtained by reprecipitating and refining the reaction product was 132 g. The styrene content in this polymer was calculated to be 10.7% by using a calibration curve prepared in advance from an infrared absorption spectrum of a blend of a chlorinated polypropylene and polystyrene. This polymer was extracted with acetone, utilizing the fact that the chlorinated polypropylene was poorly soluble in acetone but that the polystyrene was soluble in acetone. The styrene content in the insoluble part was calculated to be 9.6 wt.%. It was thus determined that the greater part of the polymerized styrene was bonded in the form of graft to the chlorinated polypropylene.

The graft polymer obtained by the above process and an acrylonitrile-butadiene rubber (29% acrylonitrile) were dissolved in toluene : tetrahydrofuran (at a weight ratio of 1 : 1) in the following recipe. Then the solution was applied by using a Meyer bar to coat the surface of a biaxially stretched polypropylene film (of a thickness of 20 microns) pretreated with corona discharge and having a contact angle of 60 degrees with water and was then dried for 10 minutes in an oven at 110° C. The dried coating amount was 0.5 to 0.6 g./m².

Then the below mentioned top-coating (Recipe A) consisting mostly of a vinylidene chloride-acrylic ester copolymer emulsion (85% vinylidene chloride) was applied by using a Meyer bar to coat said under-coated surface. The coated film was dried for 1 minute in an oven at 115° C. The amount of the combination of the under-coating and top-coating deposited on the film after drying was 5.5 to 6.0 g./m².

In the following table, Examples 9-1 and 9-9 are outside the scope of the present invention and are shown for reference purposes. The properties of the thus obtained coated films are shown in Table 9.

Table 9

| Example No. | Under-coating Graft polymer acrylonitrile butadiene rubber (weight ratio) | Top-Coating | Adhesive cellophane tape test | Heat seal strength (g/15 mm) |
|---|---|---|---|---|
| 9-1 (control) | 0/100 | | Bad | 148 |
| 9-2 | 5/95 | | Excellent | 188 |
| 9-3 | 10/90 | | " | 212 |
| 9-4 | 25/75 | | " | 275 |
| 9-5 | 50/50 | Top-Coating Recipe (A) | " | 355 |
| 9-6 | 75/25 | | " | 348 |
| 9-7 | 90/10 | | " | 285 |
| 9-8 | 95/5 | | " | 208 |
| 9-9 (control) | 100/9 | | | 187 |

| Top-coating (Recipe A): | Parts by weight as solid component |
|---|---|
| Vinylidene chloride-acrylic ester copolymer emulsion (85% vinylidene chloride) (solid content: 50 wt.%) | 100 |
| Wax (of a melting point) of 65° C) emulsion | 2.0 |
| Calcium carbonate | 0.1 |

Each of the coated films in Examples 9-2 to 9-8 had a water vapor permeability of 6 g./m²/24 hrs. and an oxygen gas permeability of 24 cc/m²/24 hrs. and was excellent in transparency.

EXAMPLE 10

The under-coating and top-coating used in Example 9-5 were prepared by using the graft polymer used in the above mentioned Example 9 and were applied in the same manner as in Example 9, varying the coating amounts, to coat biaxially stretched polypropylene films of a thickness of 20 microns treated with corona discharge. The properties of the coated films are shown in Tables 10A and 10B.

Table 10A

| Example No. | Coating amount of top-coating (g/m²) | Coating amount of under-coating + top-coating (g/m²) | Adhesive cellophane tape test | Heat seal strength (g/15 mm) | Water vapor permeability (g/m²/24 hrs) | Oxygen gas permeability (cc/m²/24 hrs) | Transparency |
|---|---|---|---|---|---|---|---|
| 10-1 | 0.5 | 3.5 | Excellent | 283 | 6 | 39 | Excellent |
| 10-2 | 0.5 | 6.3 | " | 361 | 6 | 22 | " |
| 10-3 | 0.6 | 8.1 | " | 396 | 5 | 19 | " |
| 10-4 | 0.5 | 0.4 | " | 418 | 5 | 15 | Good |

Table 10B

| Example No. | Coating amount of under-coating (g/m²) | Coating amount of under-coating + top-coating (g/m²) | Adhesive cellophane tape test | Heat seal strength (g/15 mm) | Water vapor permeability (g/m²/24 hrs) | Oxygen gas permeability (cc/m²/24 hrs) | Transparency |
|---|---|---|---|---|---|---|---|
| 10-5 | 0.4 | 5.3 | Excellent | 276 | 6 | 24 | Excellent |
| 10-6 | 0.6 | 5.8 | " | 358 | 6 | 23 | " |
| 10-7 | 0.9 | 6.2 | " | 375 | 6 | 24 | " |
| 10-8 | 1.2 | 6.6 | " | 387 | 5 | 22 | " |

EXAMPLE 11

Under-coatings of the below mentioned recipes were prepared by using the graft polymer used in the above mentioned Example 9 and acrylonitrile-butadiene rubbers of different acrylonitrile contents and were applied in the same manner as in Example 9 and then the top-coating (Recipe A) was applied. The coating amount of the under-coating + top-coating was 5.5 to 6.0 g./m². The properties of the coated films are shown in Table 11.

Table 11

| Example No. | Under-coating Graft polymer/ acrylonitrile-butadiene rubber | Acrylonitrile content (%) in acrylonitrile-butadiene rubber | Top-coating | Adhesive cellophane tape test | Heat seal strength (g/15 mm) |
|---|---|---|---|---|---|
| 11-1 | 50/50 | 19 | | Excellent | 329 |
| 11-2 | 50/50 | 33 | | " | 348 |
| 11-3 | 50/50 | 41 | Recipe (A) | " | 351 |
| 11-4 (control) | 0/100 | 19 | | Bad | 144 |
| 11-5 (control) | 0/100 | 33 | | " | 133 |
| 11-6 (control) | 0/100 | 41 | | " | 138 |

Examples 11-4 to 11-6 are controls to be compared to Examples 11-1 to 11-3 and are outside the scope of the present invention. Each of the coated films in Examples 11-1 to 11-3 had a water vapor permeability of 6 g./m²/24 hrs. and an oxygen gas permeability of 24 cm/m²/24 hrs. and was excellent in the transparency.

Example 12

The graft polymer used in this example was prepared as follows. An isotactic polypropylene of an intrinsic viscosity of 1.5 dl./g. was chlorinated by the same process as described in Example 9-1 to obtain a chlorinated polypropylene of a chlorine content of 28% by weight and an intrinsic viscosity of 1.3 dl./g. Then 120 g. of this chlorinated polypropylene, 0.7 liter of benzene and 60 g. of styrene were placed in a polymerization reactor of a capacity of 1 liter and were well agitated to form a solution. Then 3 g. of reduced iron were placed in the solution. The solution was reacted at 60° C for 5 hours under a nitrogen atmosphere. The amount of the obtained polymer was 131 g. and it had a styrene content of 9.1 wt.%.

This graft polymer, an acrylonitrile-butadiene rubber (of an acrylonitrile content of 29 wt.%) and a chlorinated polypropylene (of a chlorine content of 30% by weight) were dissolved in toluene : tetrahydrofuran (of a weight ratio of 1 : 1) and were then mixed to prepare under-coatings as are set forth below and the top-coating recipe (A) was used for the top-coating to prepare a coated film in the same manner as described in Example 9. The coating amount of the under-coating was 0.5 to 0.6 g/m² and the coating amount of the combination of the under-coating and top-coating was 5.5 to 6.0 g./m².

The properties of the coated films are as shown in Table 12.

Table 12

| Example No. | Under-coating Graft polymer/chlorinated polypropylene/acrylonitrile-butadiene rubber | Top-coating | Adhesive cellophane tape test | Heat seal strength (g/15mm) | Oxygen gas Barrier property (cc/m²/24 hrs) |
|---|---|---|---|---|---|
| 12-1 | 40/10/50 | | Excellent | 354 | 21 |
| 12-2 | 30/20/50 | | " | 348 | 23 |
| 12-3 | 30/45/25 | Top-coating Recipe (A) | " | 311 | 23 |
| 12-4 | 20/30/50 | | " | 328 | 22 |
| 12-5 | 5/20/75 | | " | 322 | 24 |
| 12-6 (control) | 0/50/50 | | " | 170 | 23 |

EXAMPLE 13

The under-coating used in Example 9-5 was applied and dried in the same manner as in Example 9 and then a top-coating (Recipe B) was applied to coat said coated film surface and was then dried to prepare a coated film. In this case, films treated and not treated with corona discharge (the latter having a contact angle of 83 degrees with water) were also coated.

| Top-coating (Recipe B) Vinylidene chloride-vinyl chloride- | Parts by weight as solid component |
|---|---|
| acrylic ester copolymer emulsion (87/8/5) (solid content: 50 wt.%) | 100 |
| Wax emulsion (of a melting point of 65° C) | 2.0 |
| Calcium carbonate | 0.1 |

The properties of the coated films are shown in Table 13.

Table 13

| Example No. | Corona discharge treatment | Coating amount of under coating (g/m²) | Coating amount of under coating + top coating (g/m²) | Adhesive cellophane tape test | Heat seal strength (g/15 mm) | Water vapor permeability (g/m²/ 24 hrs) | Oxygen gas permeability (cc m²/24 hrs | Transparency |
|---|---|---|---|---|---|---|---|---|
| 13-1 | Done | 0.6 | 4.1 | Excellent | 312 | 6 | 32 | Excellent |

Table 13-continued

| Example No. | Corona discharge treatment | Coating amount of under coating (g/m²) | Coating amount of under coating + top coating (g/m²) | Adhesive cellophane tape test | Heat seal strength (g/15 mm) | Water vapor permeability (g/m²/ 24 hrs) | Oxygen gas permeability (cc m²/24 hrs) | Transparency |
|---|---|---|---|---|---|---|---|---|
| 13-2 | " | 0.5 | 7.6 | " | 376 | 7 | 18 | " |
| 13-3 | " | 0.6 | 10.8 | " | 431 | 5 | 15 | Good |
| 13-4 | Not Done | 0.6 | 4.5 | Excellent | 308 | 6 | 35 | Excellent |
| 13-5 | " | 0.5 | 7.4 | " | 364 | 5 | 20 | " |
| 13-6 | " | 0.5 | 10.3 | " | 435 | 5 | 14 | Good |

EXAMPLE 14

The graft polymer used in Example 9 was prepared and the polymerizing time for the grafting reaction was varied to prepare graft polymers of different styrene contents.

Such graft polymer and an acrylonitrile-butadiene rubber (of an acrylonitrile content of 33%) were dissolved in tetrahydrofuran to prepare the below mentioned under-coatings. Said under-coatings were applied by using a top-coating (Recipe A) in exactly the same manner as described in Example 9 to prepare a coated film wherein the coating amount of the under-coating was 0.5 to 0.6 g./m² and the total coating amount of the under-coating and top-coating was 5.5 to 6.0 g./m².

The properties of the obtained coated films are shown in Table 14.

Table 14

| Example No. | Under-coating Graft polymer/ acrylonitrile-butadiene rubber | Styrene content (%) in graft polymer | Top-coating | Adhesive cellophane tape test | Heat seal strength (g/15mm) | Oxygen gas permeability (cc/m²/24 hrs) |
|---|---|---|---|---|---|---|
| 14-1 | 50/50 | 3.5 | Top-coating Recipe (A) | Excellent | 298 | 22 |
| 14-2 | 50/50 | 7.8 |  | " | 331 | 22 |
| 14-3 | 50/50 | 14.6 |  | " | 328 | 22 |
| 14-4 | 50/50 | 20.5 |  | " | 294 | 21 |

Each of the coated films in Examples 14-1 to 14-4 had a water vapor permeability of 6 g./m²/24 hrs. and was excellent in transparency.

EXAMPLE 15

The graft polymer used in this example was prepared as follows. An isotactic polypropylene of an intrinsic viscosity of 1.0 dl./g. was dissolved in tetrachlorethylene at 120° C. The solution was chlorinated by blowing chlorine gas into it, and the chlorinating time was varied to obtain chlorinated polypropylenes of chlorine contents of 18, 25 and 40% by weight. The graft polymers prepared in the same manner as in the case of Example 9 from these polymers had styrene contents, respectively, of 11.0, 10.2 and 10.6 wt.%.

In the same manner as described in Example 14, by using this graft polymer, an acrylonitrile-butadiene rubber (of an acrylonitrile content of 33%) was dissolved in tetrahydrofuran and then an under-coating of the below mentioned recipe was prepared and was applied in exactly the same manner to prepare a coated film wherein the coating amount of the under-coating was 0.5 to 0.6 g./m² and the total coating amount was 5.5 to 6.0 g./m².

The properties of the obtained coated films are shown in Table 15.

Table 15

| Example No. | Graft polymer/ acrylonitrile-butadiene rubber | Chlorine content (% by weight) in chlorinated polypropylene | Styrene content (% by weight) in graft polymer | Top-coating | Adhesive cellophane tape test | Heat seal strength (g/15mm) | Oxygen gas barrier property (cc/m²/ 24 hrs) |
|---|---|---|---|---|---|---|---|
| 15-1 | 50/50 | 18 | 11.0 |  | Excellent | 323 | 20 |
| 15-2 | 50/50 | 25 | 10.2 |  | " | 336 | 22 |
| 15-3 | 50/50 | 40 | 10.6 | Top-coating Recipe (A) | " | 298 | 23 |
| 15-4 (control) | 50/50 | 18 | 0 |  | " | 155 | 21 |
| 15-5 (control) | 50/50 | 25 | 0 |  | " | 159 | 22 |
| 15-6 (control) | 50/50 | 40 | 0 |  | " | 142 | 24 |

Examples 15-4 to 15-6 are controls and are outside the scope of the present invention. Each of the coated films in Examples 15-1 to 15-3 had a water vapor permeability of 6 g./m²/24 hrs. and was excellent in transparency.

The embodiments of the invention in which an exclusive property or privilege is claimed are defined as follows:

1. A polypropylene or poly-4-methylpentene-1 film coated with
   I. an undercoating consisting essentially of a mixture of
      a. a graft polymer of chlorinated polypropylene, as the backbone polymer, having grafted thereto from 2 to 30 percent by weight, based on the weight of the graft polymer, of either a chlorinated vinyl monomer or a styrene monomer, wherein said chlorinated polypropylene has a chlorine content of from 15 to 55 percent by weight and has an intrinsic viscosity of from 0.3 to 3.0 dl/g, wherein intrinsic viscosity is determined by measuring the viscosity of a solution of 0.2 to 0.5 percent by weight of said chlorinated polypropylene in decalin at 135° C, wherein said chlorinated vinyl monomer contains from 50 to 100 percent by weight of vinyl chloride, vinylidene chloride, or mixtures thereof, and the balance is a vinyl monomer or a mixture of vinyl monomers copolymerizable with vinyl chloride or vinylidene chloride, wherein said styrene monomer contains 50 to 100 percent by weight of styrene, or nucleus-substituted styrene, or α-hydrogen substituted styrene, or mixtures thereof, and the balance is a vinyl monomer or a mixture of vinyl monomers copolymerizable with said styrene monomer, b. acrylonitrile-butadiene rubber; wherein the weight ratio of $a/b$ is from 95/5 to 5/95, and c. zero to 70 percent by weight of said chlorinated polypropylene, and, II. a top coating consisting essentially of a vinylidene chloride copolymer containing from 80 to 95 weight percent of vinylidene chloride monomer units.

2. A coated film as claimed in claim 1 in which the intrinsic viscosity of said chlorinated polypropylene is from 0.5 to 1.5 dl/g.

3. A coated film as claimed in claim 1 in which the substrate film is a biaxially stretched polypropylene film.

4. A coated film as claimed in claim 1 in which the combined thickness of the undercoat and the topcoat is from 1 to 10 microns.

5. A coated film as claimed in claim 1 in which the weight ratio of $a/b$ is from 25/75 to 75/25.

* * * * *